United States Patent Office 3,435,032
Patented Mar. 25, 1969

3,435,032
THIADIAZINE RING CONTAINING ETHYLENE DITHIOCARBAMATE COMPOUNDS
Shiro Watanabe, Osaka, and Susumu Misaki, Sakai-shi, Japan, assignors to Daikin Kogyo Co., Ltd., Osaka, Japan
No Drawing. Filed May 4, 1966, Ser. No. 547,422
Claims priority, application Japan, Dec. 15, 1965, 40/77,404
Int. Cl. C07f 15/00, 3/00; A01n 9/12
U.S. Cl. 260—242          2 Claims

ABSTRACT OF THE DISCLOSURE

Thiadiazine-ring containing ethylene dithiocarbamate compounds of the formula:

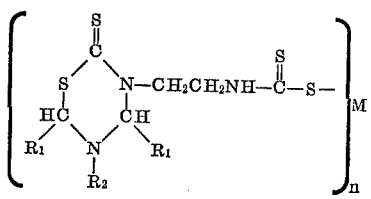

wherein $R_1$ is hydrogen, methyl or phenyl, $R_2$ is hydrogen, alkyl having 1 to 6 carbon atoms or benzyl, M is a metal having a valency of 2–3 selected from Zn, Cu, Mn, Co, Cd and Fe, and $n$ is an integer 2–3, a method for preparing said compounds by reacting 3,3′-ethylene-bis-(tetrahydro-thionothiadiazine) with a salt of the corresponding metal in the presence of water and an agricultural fungicidal composition having incorporated therein a minor effective amount of at least one of said compounds in admixture with a major amount of inert carrier.

---

This invention deals with novel dithiocarbamic acid derivatives. It also deals with agricultural fungicidal compositions containing as an active ingredient at least one of these dithiocarbamic acid derivatives. It further deals with a method for the preparation of these dithiocarbamic acid derivatives.

Control of agricultural pestiferous fungi is a complicated and continuing problem. Although the use of chemicals has greatly increased in recent years, they have not alleviated all the problems associated with fungus control. Many materials are on the market and are widely accepted as effective agricultural fungicides.

However, from the viewpoints of the ranges of plant and fungi to which they are applicable, and of the respective response of the plant, human being, domestic animals, fishes and others, to which they are applied, none of the chemicals found can be relied upon. For example, Bordeaux mixture, a classical agricultural fungicide, is very effective in the control of various fungi, e.g., anthracnose, downy mildew, phytophthora rot etc. of the vegetative plants, but it is said that this chemical is not suitable for use in controlling fungus disease of wheat, plum and others due to the susceptibility thereto and that considerable caution should be paid to the compatibility of Bordeaux mixture with other chemicals. The fungicides Zineb and Maneb are effective on, for example, downy mildew, and anthracnose of melon, and phytophthora rot of tomato and potato etc., however, the variety of disease and plants to which they can be applied is not as broad as with the Bordeaux mixture. Organic mercuric compounds are also commonly used as an excellent fungicide, but they are very toxic to men and livestock and further include a hard question as to compatibility with other chemicals.

Accordingly, the primary object of the invention is to provide a novel fungicidal composition which is applicable to various fungal diseases of a wide range of vegetables and crops. Another object is to provide a novel fungicidal composition which is essentially free from detrimental effects on the host-plants. A further object is to provide a novel fungicidal composition which may cause no harm to men and livestock and fish. Still another object is to provide a novel fungicidal composition which is compatible with almost any of the conventional agricultural chemicals.

To attain these objects, this invention provides fungicidal compositions containing as an active ingredient at least one of the novel dithiocarbamic acid derivatives represented by the Formula 1:

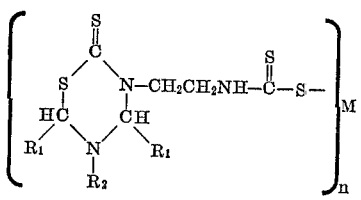

Formula 1

In this formula, $R_1$ is hydrogen, a methyl or a phenyl radical, $R_2$ is hydrogen, an alkyl group of 1 to 6 carbon atoms or a benzyl radical, M is a metal of the valency of 2 to 3 selected from the group consisting of Zn, Cu, Mn, Co, Cd and Fe, and $n$ is an integer of 2 to 3.

These compositions are surprisingly effective against various fungal diseases of a wide range of vegetable and crops. They are particularly useful for the control of anthracnose, downy mildew, phytophthora rot of various vegetables, for example, cucumber, tomato, cucurbit, potato, eggplant and onion, early blight and leaf mould of tomato, and blast and helminthosporium leaf spot of rice plant etc. At effective concentrations they are relatively nontoxic, nonirritating, nonvolatile and are highly stable preparations. Even if an excess amount of the material is directly applied to the leaves and stems of vegetable plant, no detectable injurious effects are caused thereby, and the compositions are able to control perfectly the fungal diseases of plants without the need of several applications as required by fungicides such as Zineb and Maneb. That is, a single spraying, in many cases, will suffice for the protection of the plant and the control of the fungus. The active ingredients of our fungicidal compositions are, as hereinabove described, novel compounds of the Formula 1 and they can be prepared by reacting 3,3′-ethylene bis(tetrahydrothiadiazine) with a salt of such metal as Zn, Cu, Mn, Co, Cd and Fe in the presence of water. This reaction, taking the case of zinc chloride, may be diagrammatically shown as the following:

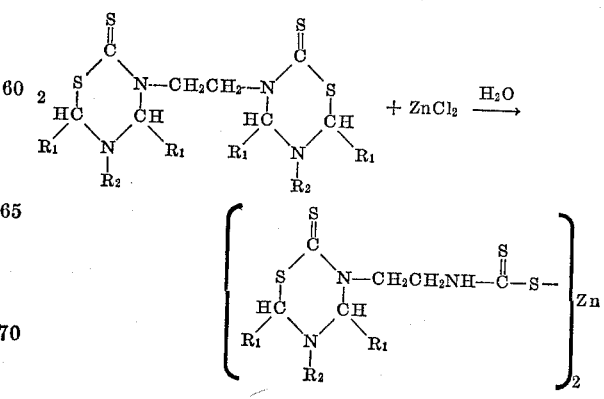

in which $R_1$ and $R_2$ have respective meanings as mentioned above.

As will be easily understood from the reaction formula, the present novel compounds are generally obtained from one mole of 3,3'-ethylene-bis-(tetrahydrothionothiazine) and $1/n$ mole of a metal salt, $n$ being an integer signifying the valency of the employed metal. Preferably 3,3'-ethylene-bis-(tetrahydrothionothiadiazine) is dispersed in a medium such as water or a mixture of water and an inert organic solvent, and is added drop by drop to a solution of metal salt in water, or if desired in organic solvent, and the combined solution is heated under continuous stirring to obtain the object compound.

The reaction may be successfully carried out by using the various derivatives of said 3,3'-ethylene-bis-(tetrahydrothionothiadiazine) as a raw material, and such an alternation may freely and easily be chosen by those skilled in the art. The 3,3'-ethylene-bis-(tetrahydrothionothiadiazine) may be conveniently prepared by using a method as described in U.S. Patent No. 3,085,046.

Examples of the new compounds of the invention include zinc bis-[beta-(tetrahydro-5-methyl-2H-1,3,5-thiadiazin-3-yl-2-thion)-ethyldithiocarbamate];
cobalt bis-[beta-(tetrahydro-5-methyl-2H-1,3,5-thiadiazin-3-yl-2-thion)-ethyldithiocarbamate];
manganium bis-[beta-(tetrahydro-5-methyl-2H-1,3,5-thiadiazin-3-yl-2-thion)-ethyldithiocarbamate];
iron-tris-[beta-(tetrahydro-5-methyl-2H-1,3,5-thiadiazin-3-yl-2-thion)-ethyldithiocarbamate];
zinc bis-[beta-(tetrahydro-4,5,6-trimethyl-2H-1,3,5-thiadiazin-3-yl-2-thion)-ethyldithiocarbamate];
zinc bis-[beta-(tetrahydro-4,6-dimethyl-2H-1,3,5-thiadiazin-3-yl-2-thion)-ethyldithiocarbamate];
copper bis-[beta-(tetrahydro-4,6-dimethyl-2H-1,3,5-thiadiazin-3-yl-2-thion)-ethyldithiocarbamate];
iron tris-[beta-(tetrahydro-4,6-dimethyl-2H-1,3,5-thiadiazin-3-yl-2-thion)-ethyldithiocarbamate];
zinc bis-[beta-(tetrahydro-4,6-diphenyl-5-methyl-2H-1,3,5-thiadiazin-3-yl-2-thion)-ethyldithiocarbamate];
manganium bis-[beta-(tetrahydro-4,6-diphenyl-5-methyl-2H-1,3,5-thiadiazin-3-yl-2-thion)-ethyldithiocarbamate];
zinc bis-[beta-(tetrahydro-5-benzyl-2H-1,3,5-thiadiazin-3-yl-2-thion)-ethyldithiocarbamate];
cadmium bis-[beta-(tetrahydro-5-isopropyl-2H-1,3,5-thiadiazin-3-yl-2-thion)-ethyldithiocarbamate];
copper bis-[beta-(tetrahydro-5-ethyl-2H-1,3,5-thiadiazin-3-yl-2-thion)-ethyldithiocarbamate];
zinc bis-[beta-(tetrahydro-4,6-dimethyl-5-n-propyl-2H-1,3,5-thiadiazin-3-yl-2-thion)-ethyldithiocarbamate];
manganium bis-[beta-(tetrahydro-5-n-butyl-2H-1,3,5-thiadiazin-3-yl-2-thion)-ethyldithiocarbamate];
iron bis-[beta-(tetrahydro-4,6-diphenyl-5-n-amyl-2H-1,3,5-thiadiazin-3-yl-2-thion)-ethyldithiocarbamate]; and
zinc bis-[beta-(tetrahydro-5-n-hexyl-2H-1,3,5-thiadiazin-3yl-2-thion)-ethyldithiocarbamate].

These compounds are very stable, amorphous powdery materials, and are generally soluble in a polar solvent such as dimethyl formamide, dimethyl sulfoxide and pyridine, etc., but substantially insoluble in water or non-polar organic solvent.

By way of illustration, the ratio of control against phytophthora rot of tomato and the oral toxicity in terms of $LD_{50}$/kg. towards most of the typical compounds are listed in Table 1.

In this table, the ratio of control against phytophthora rot is determined as follows: A test compound is first dispersed in water at a concentration of 2,000 p.p.m., and this is sprayed uniformly onto each pot containing 20 tomato seedlings, each tomato being in the stage of 10 to 13 leaves. On the following day, a water suspension of the spores of phytophthora infestance is sprayed thereon, and the extent of an attack of the disease is checked after one week therefrom. The ratio of control is calculated by using the equation.

Ratio of control =

$$\frac{\text{Total number of attacked leaves in nontreated pot} - \text{Total number of attacked leaves in treated pot}}{\text{Total number of attacked leaves in nontreated pot}}$$

| Chemical structure | | Ratio of control of phytophthora rot of tomato | Oral toxicity $LD_{50}$ g./kg. in mouse |
|---|---|---|---|
| (structure with 5-methyl thiadiazine, ethyldithiocarbamate)$_2$ | Zn | 98 | 3.0 |
| (structure with 5-methyl thiadiazine, ethyldithiocarbamate)$_2$ | Co | 97 | 4.7 |
| (structure with 5-methyl thiadiazine, ethyldithiocarbamate)$_2$ | Mn | 99 | 2.8 |
| (structure with 5-methyl thiadiazine, ethyldithiocarbamate)$_3$ | Fe | 99 | 0.5 |
| (structure with 4,5,6-trimethyl thiadiazine, ethyldithiocarbamate)$_2$ | Zn | 97 | 3.5 |
| (structure with 4,6-dimethyl thiadiazine, ethyldithiocarbamate)$_2$ | Zn | 99 | 3.8 |
| (structure with 4,6-dimethyl thiadiazine, ethyldithiocarbamate)$_2$ | Cu | 92 | 1.2 |

| Chemical structure | Ratio of control of phytophthora rot of tomato | Oral toxicity LD$_{50}$ g./kg. in mouse |
|---|---|---|
| [S=C(S-)(N-CH$_2$CH$_2$NH-C(=S)-S-) ring with HC-CH, CH$_3$, CH$_3$, NH]$_3$ Fe | 98 | 0.7 |
| [S=C(S-)(N-CH$_2$CH$_2$NH-C(=S)-S-) ring with HC-CH, C$_6$H$_5$, C$_6$H$_5$, N-CH$_3$]$_2$ Zn | 85 | 4.3 |
| [S=C(S-)(N-CH$_2$CH$_2$NH-C(=S)-S-) ring with HC-CH, C$_6$H$_5$, C$_6$H$_5$, N-CH$_3$]$_2$ Mn | 99 | 3.0 |
| [S=C(S-)(N-CH$_2$CH$_2$NH-C(=S)-S-) ring with H$_2$C-CH$_2$, N-CH$_2$-C$_6$H$_5$]$_2$ Zn | 89 | 4.2 |
| [S=C(S-)(N-CH$_2$CH$_2$NH-C(=S)-S-) ring with H$_2$C-CH$_2$, N-isoC$_3$H$_7$]$_2$ Cd | 95 | 3.5 |
| [S=C(S-)(N-CH$_2$CH$_2$NH-C(=S)-S-) ring with H$_2$C-CH$_2$, N-C$_2$H$_5$]$_2$ Cu | 92 | 1.0 |
| [S=C(S-)(N-CH$_2$CH$_2$NH-C(=S)-S-) ring with HC-CH, CH$_3$, CH$_3$, N-n-C$_3$H$_7$]$_2$ Zn | 92 | 4.1 |
| [S=C(S-)(N-CH$_2$CH$_2$NH-C(=S)-S-) ring with H$_2$C-CH$_2$, N-n-C$_4$H$_9$]$_2$ Mn | 90 | 3.0 |
| [S=C(S-)(N-CH$_2$CH$_2$NH-C(=S)-S-) ring with HC-CH, C$_6$H$_5$, C$_6$H$_5$, N-n-C$_5$H$_{11}$]$_2$ Fe | 87 | 0.8 |
| [S=C(S-)(N-CH$_2$CH$_2$NH-C(=S)-S-) ring with H$_2$C-CH$_2$, N-n-C$_6$H$_{13}$]$_2$ Zn | 85 | 4.5 |

The preferred embodiments of the present invention are (1) methods for the control of pestiferous fungi of various vegetables and crops which comprises applying to plant and plant growth media an effective dosage of an above-defined dithiocarbamate derivative; and (2) compositions useful for the control of fungal diseases of vegetables and crops which contain as an active ingredient at least dithiocarbamate as defined hereinabove. Normally such compositions contain the active ingredient in admixture with an inert carrier, and can be formulated by conventional methods into any desired form, such as dust or wettable powder. Solid carriers are employed in accordance with the desired form of preparation, and the resultant preparations are employed by diluting to the desired order of concentration.

To prepare dust, for instance, any one of the active ingredients of this invention is homogeneously mixed in the order of from 1 to 80% by weight with an inert carrier, such as talc, clay, bentenite, diatomaceous earth and silica. There may be added a coloring or an adhesive agent, if desirable.

To prepare a wettable powder, any one of the active ingredients of this invention is homogeneously mixed with any one of the aforespecified carriers. As a surfactant, there are employed ionic or nonionic surface active agents, such as organic sodium sulfonate, a condensation product of ethylene oxide or propylene oxide and an organic acid, phenol or sugar esters and soap. There may be added a coloring or an adhesive agent, when desired, such as polyvinyl alcohol and ligninsulfonate. The resultant powder is homogeneously diluted with water.

Since the present compounds are stable, they can be combined and used together with many other agricultural chemicals, such as, herbicides, insecticides, fungicides, plant growth regulators, and fertilizers, without acidic or basic compounds, which is one of the most outstanding characteristics of the present compositions.

In carrying out the method of the present invention, the exact amount of the dithiocarbamate compound or composition thereof desirably administered varies with the type of pestiferous fungi to be controlled, plant species to be treated and whether the application is to be made to plant or to soil or other growth medium. For example, in the control of pestiferous fungi of tomato, cucumber and similar vegetables, a minimum effective administration dosage is as little of 700 p.p.m., and however the upper limit is primarily a matter of economic practicability. In most field conditions, the compound of the present invention is usually applied to plant in an amount of 10–50 grams/acre. However, it has to be emphasized that a lesser or larger amount may be successfully employed depending upon the extent of fungi infestation, fungal and plant species, temperature and climatic conditions.

The following examples are given only to aid the understanding of the invention and it is to be understood that this invention is not restricted to the particular materials, proportions or procedures set forth therein.

EXAMPLE 1

16 grams of 3,3'-ethylene-bis(tetrahydro-5-methyl-2H-1,3,5-thiadiazine-2-thion) were suspended in a mixture of 200 ml. of water and 10 ml. of methanol, and the suspension was heated at 80° C. and added drop by drop to a solution of zinc chloride (3.5 grams) in a mixture of water (10 ml.) and methanol (10 ml.). After 5 hours, the mixture was cooled to precipitate out the crystals, and the thus recovered product was washed with water and dried to get 12 grams of white powder. This compound began to slightly color at 230° C., but didn't melt at 250° C. and thus gave an indistinct melting point at a temperature over 250° C.

From the elemental analysis shown below, this compound was determined as to have the following formula:

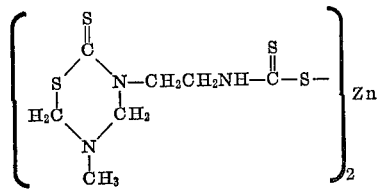

Elemental analysis (percent). Found: C, 27.5; H, 3.71; N, 13.8; S, 43.2. Theory as $(C_7H_{12}N_3S_4)_2Zn$: C, 28.2; H, 3.69; N, 14.1; S, 42.9.

In an infrared absorption spectrum of the compound, two characteristic absorptions were found at 3,250 cm.$^{-1}$ and 1,500 cm.$^{-1}$.

EXAMPLE 2

17.5 grams of 3,3'-ethylene-bis(tetrahydro-4,6-dimethyl-2H-1,3,5-thiadiazine-2-thion) were suspended in a mixture of 200 ml. of water and 10 ml. of methanol. After heating the suspension at 50° C., a solution of $ZnSO_4 7H_2O$ (7.5 grams) in water (20 ml.) was added drop by drop to the suspension, and thereafter the mixed solution was heated under stirring for another 5 hours. The mixture was then cooled to precipitate out the product and the recovered product was washed with water and dried to obtain 14.5 grams of pale yellow powder.

This compound was decomposed at 175–185° C., and was determined as having the formula:

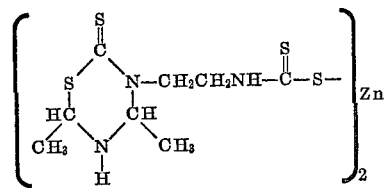

on the basis of the following analytical data.

Elemental analysis (percent). Found: C, 29.4; H, 4.87; N, 12.49; S, 41.8. Theory as $(C_8H_{14}N_3S_4)_2$ Zn: C, 30.7; H, 4.47; N, 13.4; S, 41.1.

Characteristic absorptions were found at 3,250 cm.$^{-1}$ and 1,530 cm.$^{-1}$ in an infrared absorption spectrum.

EXAMPLE 3

17.5 grams of 3,3'-ethylene-bis(tetrahydro-4,6-dimethyl-2H-1,3,5-thiadiazine-2-thion) were suspended in a mixture of 260 ml. of water and 10 ml. of methanol. After heating the mixture at 50° C., a solution of $CuCl_2 2H_2O$ (8.6 grams) in water (20 ml.) was added drop by drop to the mixture, and when about a half of the solution was added, the content of the reactor changed color from white to earth yellow, and thereafter to a dark brown solution. After 3 hours, the solution was cooled, filtered, and thus 15.5 grams of reddish brown powder were obtained.

This compound decomposed at about 150° C. and had the following formula:

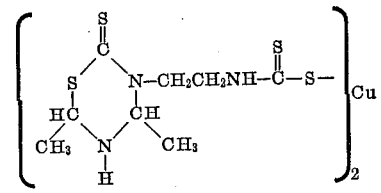

Elemental analysis (percent). Found: C, 29.9; H, 4.40; N, 13.1; S, 41.4. Theory as $(C_8H_{14}N_2S_4)_2$ Cu: C, 30.8; H, 4.48; N, 13.45; S, 41.2.

Characteristic absorptions were found at 3,250 cm.$^{-1}$ and 1,500 cm.$^{-1}$ in an infrared absorption spectrum respectively.

EXAMPLE 4

19 grams of 3,3'-ethylene-bis-(tetrahydro-5-isopropyl-2H-1,3,5-thiadiazine-2-thion) were suspended in a mixture of 200 ml. of water and 10 ml. of methanol. After heating the mixture at 80° C., a solution of $CdCl_2 \cdot 5H_2O$ (6 grams) in water was added drop by drop thereto, and the mixture was reacted at the same temperature for 5 hours. Using the same procedure as described in Example 1, 13.5 grams of pale yellow powdery product were obtained. The structure of the compound was determined as

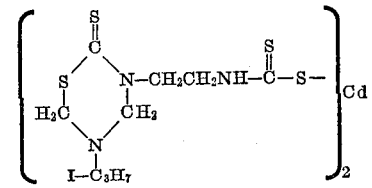

from an elemental analysis data.

EXAMPLE 5

A wettable powder was formulated by mixing 50 parts of the active compound obtained in Example 2, 30 parts of diatom, 10 parts of polyvinyl alcohol (vehicle) and 10 parts of sodium laurylsulfonate, and grinding the mixture to 300 mesh size.

400 grams of this mixture were dissolved in 100 liters of water, and the suspension was sprayed over 10 acres of cucumber field using a conventional sprayer. No fungal diseases were found in the treated area, while the severe infestations of anthrocnose, downy mildew and phytophthora rot were found in the neighbouring untreated area. By this treatment, no injury on plant was detected, and almost 10 times as many cucumbers were obtained as compared with those of untreated area.

EXAMPLE 6

1 kg. of the wettable powder obtained in the preceding Example 5 were diluted with 200 liters of water and this suspension was sprayed over 10 acres of tomato field by using a common sprayer. No fungal diseases and plant injuries were found in the treated area, while severe infestations of early blight and leaf mould were detected in the neighbouring untreated area.

Almost 2 times as many good tomatoes were obtained in this treated area as compared with those of untreated area.

EXAMPLE 7

5 parts of the compound prepared in Example 3 were mixed with 75 parts of talc and 20 parts of diatom, and the mixture was ground well to give fine powder of less than 300 mesh size. 3 kg. of this dust composition were sprayed over 10 acres of rice field where a light infestation of blast was observed. Complete controls of blast, helminthosporium leaf spot and other fungal disease were obtained by this treatment.

What we claim is:

1. Thiadiazine-ring containing ethylene dithiocarbamate of the formula:

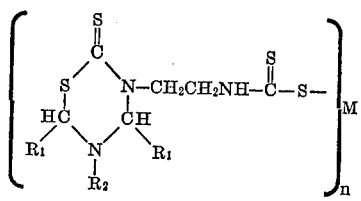

wherein $R_1$ is a member selected from the group consisting of hydrogen, methyl group and phenyl radical, $R_2$ is a member selected from the group consisting of hydrogen, alkyl group having 1 to 6 carbon atoms, and benzyl radical, M is a metal having the valency of 2-3 selected from the group consisting of Zn, Cu, Mn, Co, Cd and Fe, and $n$ is an integer of 2 and 3.

2. A method for preparing the thiadiazine-ring containing ethylene dithiocarbamate claimed in claim 1 comprising reacting 3,3'-ethylene-bis-(tetrahydro-thionothiadiazine) with a salt of the metal selected from the group consisting of Zn, Cu, Mn, Co, Cd and Fe, in the presence of water.

References Cited

UNITED STATES PATENTS 3,085,046   4/1963   Cummins _____ 260—243
3,126,378   3/1964   Cummins _____ 260—243

HENRY R. JILES, *Primary Examiner.*

JOHN M. FORD, *Assistant Examiner.*

U.S. Cl. X.R.

260—243; 424—245